United States Patent [19]

Kabeya et al.

[11] Patent Number: 5,428,460
[45] Date of Patent: Jun. 27, 1995

[54] REDUCED RATE FACSIMILE MACHINE

[75] Inventors: Shozo Kabeya, Anjyo; Fumihiro Minamizawa, Toyoake, both of Japan

[73] Assignee: Brother Kogyo Kabushiki Kaisha, Nagoya, Japan

[21] Appl. No.: 254,564

[22] Filed: Jun. 6, 1994

[30] Foreign Application Priority Data

Jun. 4, 1993 [JP] Japan .................................. 5-160429
Jun. 23, 1993 [JP] Japan .................................. 5-177462

[51] Int. Cl.⁶ ............................................ H04N 1/393
[52] U.S. Cl. ..................................... 358/451; 358/404
[58] Field of Search ............... 358/404, 405, 426, 443, 358/444, 447, 451, 298, 448; 355/59; 382/47, 56; 395/139; H04N 1/393

[56] References Cited

U.S. PATENT DOCUMENTS 4,731,658  3/1988  Koseki .................................. 358/451
4,860,115  8/1989  Ogwra .................................. 358/443
4,907,094  3/1990  Mishima et al. ................... 358/404
5,359,429  10/1994  Takahashi .

FOREIGN PATENT DOCUMENTS 54-3419   1/1979  Japan .
54-80021  6/1979  Japan .

Primary Examiner—Edward L. Coles, Sr.
Assistant Examiner—Kim Yen Vu
Attorney, Agent, or Firm—Oliff & Berridge

[57] ABSTRACT

A facsimile machine contains a first memory for temporarily storing image data supplied from a reception unit; a second memory for temporarily storing record data produced by a decoding unit; and a memory unoccupied area amount detection unit for detecting at least one of the amount of unoccupied memory area in the first memory and the amount of unoccupied memory area in the second memory. The machine also has a compulsory reducing unit, which converts the record data representative of an image of each of at least one page of document into reduced record data representative of an image reduced from the image of the corresponding page at a predetermined reduction rate, when at least one of the first memory unoccupied area amount and the second memory unoccupied area amount detected by the memory unoccupied area amount detection unit is equal to or less than corresponding one of first and second predetermined threshold values.

19 Claims, 7 Drawing Sheets

REDUCED RATE FACSIMILE MACHINE

BACKGROUND OF THE INVENTION

1. Field of the Invention

The present invention relates to a facsimile machine for recording transmitted or copied images on cut sheets. More particularly, the present invention relates to a facsimile machine of a type which temporarily stores, in a memory, image data representative of the images desired to be recorded, before performing a recording operation with the image data onto cut sheets.

2. Description of the Related Art

Conventionally, a typical facsimile machine is capable of transmission and reception. During transmission, a document is read by a reading unit, the image decoded and then transmitted. During reception, received image data are stored in an image data memory, decoded, developed into record data (dot data) and then stored in a record data memory. The record data are sequentially retrieved from the record data memory, and recorded in line increments on a recording paper such as a cut sheet or a roll of thermal paper.

Conventional facsimile machines can record at several different speeds. A facsimile machine receives image data from a remote facsimile machine at a transmission speed corresponding to the recording speed selected at the facsimile machine.

A facsimile machine which uses cut sheets as the recording paper can be equipped to accommodate, for example, legal size sheets (with a length of about 376 mm), A4 size sheets (with a length of about 297 mm), or letter size sheets (with a length of about 279 mm). Assume now that the transmitted document is on sheets the same size as the sheet on which the document is to be recorded, for example, both A4 size sheets. Several pages worth of image data of the transmitted document are first stored in an image data memory. Image data are then retrieved from the image data memory to be decoded and developed into record data, at one-line increments. The thus-prepared line record data are stored in a record data memory. A cut sheet is supplied to a recording unit of the facsimile machine and transported there through at a predetermined pitch for every line increment of the record data retrieved from the record data memory and recorded on the sheet. When the entire sheet is recorded on, recording processes of the facsimile machine are interrupted, the sheet in the recording unit is discharged onto a discharged sheet tray of the facsimile machine, and a new cut sheet is supplied to the recording unit.

However, sometimes the length of one page worth of incoming image data is larger than the cut sheet set in the device. This can be caused by many reasons, such as the differences between different countries in set sizes for sheets (for example, legal size and A4 size), by the slant of the transmitted document, and the presence of a header at the top of the document. When the transmitted document is a larger sheet than the sheet on which the received image data of the transmitted document is to be recorded, for example, when the document is on a legal sized sheet and the record sheet is a letter sized sheet, the amount of image data contained in the document is greater than the amount of image data that can be recorded on the record sheet. As a result, image data from one page of the transmitted document is divided into two parts with each part being recorded on a different record sheet. When one page of incoming image data is divided in this way, recording processes are interrupted in order to allow discharge of the fully recorded sheet and supply of a new sheet.

When the size of the copied or transmitted document is greater than the size of the record sheet as described above, a facsimile machine which uses a cut sheet as the record sheet will divide one page worth of image data from the document into two parts which are recorded separately on two records sheets. As a result, recording processes are interrupted, and unnecessary sheet discharge and sheet supply processes are performed. While the recorded sheet is being discharged, the image data memory continues receiving incoming image data. Therefore, the amount of data put into the image data memory becomes greater than the amount taken out therefrom for recording processes. As a result, the amount of data stored in the image data memory will increase until finally the image data memory will fill up.

When the facsimile machine is not provided with an error correction mode (ECM) function, the full image data memory will cause a transmission error because flow control of transmission of the image data can not be performed. Therefore, the full image data memory will cause reception of incoming image data to be cut off.

Printing one sheet worth of document data on two record sheets also wastes paper. To avoid wasting paper in this manner, there has been known a facsimile machine of a type which contains an automatic function for calculating a reduction rate according to the length of the incoming image data (length of the transmitted document) and the size of the record sheet on which the incoming image data is to be recorded. The incoming data is then recorded on the record sheet according to calculated reduction rate. In this type of facsimile machine, the number of lines making up one page of incoming must be known in order to calculate the reduction rate for recording the incoming image data. Therefore, recording operations can not be started until one page worth of data has been completely received. Also, because the processing speed for recording operations (including sheet supply, recording, and sheet discharge) is slower than the processing speed for storing incoming image data in an image data memory (reception buffer), when data for a plurality of pages are received, there is a possibility that the capacity of the image data memory might be insufficient. The reduction function stops when the image data memory cannot sufficiently handle the amount of incoming image data. When this happens, received image data will be recorded on a record sheet without being reduced, or the error lamp will illuminate and reception processes will stop. If received data is recorded on the cut sheet without being reduced, the number of lines of data possible are recorded on the cut sheet but the rest of the data is ignored when the length of the data exceeds the size of the cut sheet. (However, this is not a problem when the length of the received data does not exceed the size of the cut sheet.) Also, reception efficiency drops when the error lamp illuminates and reception processes stop because the image data memory or reception buffer can not hold sufficient data.

SUMMARY OF THE INVENTION

It is therefore an object of the present invention to overcome the above-described drawbacks, and to provide a facsimile machine that can prevent cut offs of incoming image data caused by the image data memory for temporarily storing the image data being full.

It is also an object of the present invention to provide a facsimile machine with an automatic reduction function capable of effective reception that can record received image data without wasting paper by recording data at a predetermined reduction rate when a memory for storing the received image data can not hold sufficient data so that the automatic function is stopped.

In order to attain the above object and other objects, the present invention provides a facsimile machine capable of recording of an image at a compulsory-set reduced rate when the amount of memory area remaining in a memory for storing image data is reduced to a certain level.

Accordingly, the present invention provides a facsimile machine, capable of receiving image data from a remote facsimile machine representative of an image of at least one page of document and recording the image of the at least one page of document onto at least one cut sheet, respectively, comprising: reception means for receiving image data representative of an image of at least one page of document transmitted from a remote facsimile machine; first memory means for temporarily storing the image data supplied from the reception means; decoding means for retrieving the image data from the first memory means and for decoding the image data into record data representative of the image of the at least one page of document; second memory means for temporarily storing the record data produced by the decoding means; memory unoccupied area amount detection means for detecting at least one of the amount of a remaining memory area in the first memory means unoccupied by the image data and the amount of a remaining memory area in the second memory means unoccupied by the record data; compulsory reducing means for compulsorily converting the record data representative of the image of each of the at least one page of document into reduced record data representative of an image reduced from the image of the corresponding page at a predetermined reduction rate, when at least one of the first memory unoccupied area amount and the second memory unoccupied area amount detected by the memory unoccupied area amount detection means is equal to or less than corresponding one of first and second predetermined threshold values; and recording means for receiving one of the record data representative of the image of each page of document and the reduced record data representative of the reduced image of the corresponding page of document and for recording the corresponding image on one cut sheet.

The compulsory reducing means may include: judging means for judging whether or not at least one of the first memory unoccupied area amount and the second memory unoccupied area amount detected by the memory unoccupied area amount detection means becomes equal to or less than the corresponding one of the first and second predetermined threshold values; and compulsory reduction achieving means for compulsorily converting the record data representative of the image of a corresponding page of document into reduced record data representative of an image reduced from the image of the corresponding page at the predetermined reduction rate if it is judged that at least one of the first memory unoccupied area amount and the second memory unoccupied area amount detected by the memory unoccupied area amount detection means is equal to or less than the corresponding one of the first and second predetermined threshold values.

The memory unoccupied area amount detection means may conduct its detecting operation, each time after when the record data representative of the image of each of the at least one page of document are completely stored in the second storing means. The memory unoccupied area amount detection means may conduct its detecting operation, at each time before when the recording means records the image of each of the at least one page of document on a cut sheet. The memory unoccupied area amount detection means may conduct its detecting operation, each time immediately after when at least one set of image data indicating at least one of the plurality of lines constituting the image of each of the at least one page of document is stored in the first memory means, where the image data representative of the image of each of the at least one page of document includes a plurality sets of image data indicating a plurality of lines constituting the image of corresponding page of document.

The compulsory reduction achieving means may include: compulsory reduction rate setting means for compulsorily setting the predetermined reduction rate at which the image of each of the at least one page of document is to be reduced to a reduced image if the judging means judges that at least one of the first memory unoccupied area amount and the second memory unoccupied area amount detected by the memory unoccupied area amount detection means is equal to or less than corresponding one of first and second predetermined threshold values; and reducing means for converting the record data representative of the image of the corresponding page of document into reduced record data representative of the image reduced from the image of the corresponding page at the set reduction rate.

The facsimile machine may further comprise a reduction rate setting means for setting a desired reduction rate, the reducing means converting the record data representative of the image of each page of document into reduced record data representative of an image reduced from the image of the corresponding page at the reduction rate set by the reduction rate setting means. The compulsory reduction rate setting means may set the predetermined reduction rate, regardless of the reduction rate set by the reduction rate setting means, if the judging means judges that at least one of the first memory unoccupied area amount and the second memory unoccupied area amount detected by the memory unoccupied area amount detection means is equal to or less than corresponding one of first and second predetermined threshold values, to thereby compulsorily cause the reducing means to convert the record data representative of the image of each page of document into reduced record data representative of an image reduced from the image of the corresponding page at the predetermined reduction rate.

The reduction rate setting means may include reduction rate calculation means for calculating the desired reduction rate, based on the amount of the image data representative of the image of each page of document and a size of the cut sheet on which the image of each page of document is to be recorded, the reducing means converting the record data representative of the image of each page of document into reduced record data representative of an image reduced from the image of the corresponding page at the desired reduction rate calculated by the reduction rate calculating means. The compulsory reduction rate setting means may set the predetermined reduction rate, regardless of the reduction rate calculated by the reduction rate calculating means, if the judging means judges that the first memory unoccupied area amount detected by the memory unoccupied area amount detection means is equal to or less than the first predetermined threshold value, to thereby compulsorily cause the reducing means to convert the record data representative of the image of each page of document into reduced record data representative of an image reduced from the image of the corresponding page at the predetermined reduction rate.

The predetermined reduction rate may preferably be determined dependently on the size of the cut sheet on which the image of each page of document is to be recorded.

The decoding means may include: decoded image data producing means for decoding the image data into decoded image data; and developing means for developing the decoded image data into record data in the form of dot data which represent a dot image formed from a plurality of dots and corresponding the image of the at least one page of document.

The reducing means may subject the record data to a thinning process in which the plurality of dots constituting the dot image representing the image of each of the at least one page of document are selectively omitted at the set reduction rate.

The record data representative of the image of each of the at least one page of document may include a plurality sets of record data indicating a plurality of lines arranged in an auxiliary scanning direction to constitute the image of the corresponding page of document, each set of the plurality sets of record data representing a dot line image formed from a plurality of dots arranged in a main scanning direction orthogonal to the auxiliary scanning direction. The reducing means may include: auxiliary scanning direction reducing means for selectively omitting the plurality of sets of record data at the set reduction rate; and main scanning direction reducing means for selectively omitting the plurality of dots represented by each set of the sets of record data selectively remained by the auxiliary scanning direction reducing means, at the set reduction rate.

According to another aspect, the present invention provides an image recording apparatus, capable of receiving image data from an external input device representative of an image of at least one page of document and recording the image of the at least one page of document onto at least one cut sheet, respectively, comprising: reception means for receiving image data representative of an image of at least one page of document transmitted from an external input device; first memory means for temporarily storing the image data supplied from the reception means; processing means for retrieving the image data from the first memory means and for processing the image data into record data representative of the image of the at least one page of document; memory unoccupied area amount detection means for detecting the amount of a remaining memory area in the first memory means unoccupied by the image data; compulsory reducing means for compulsorily converting the record data representative of the image of each of the at least one page of document into reduced record data representative of an image reduced from the image of the corresponding page at a predetermined reduction rate, when the first memory unoccupied area amount detected by the memory unoccupied area amount detection means is equal to or less than a first predetermined threshold value; and recording means for receiving one of the record data representative of the image of each page of document and the reduced record data representative of the reduced image of the corresponding page of document and for recording the corresponding image on one cut sheet.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
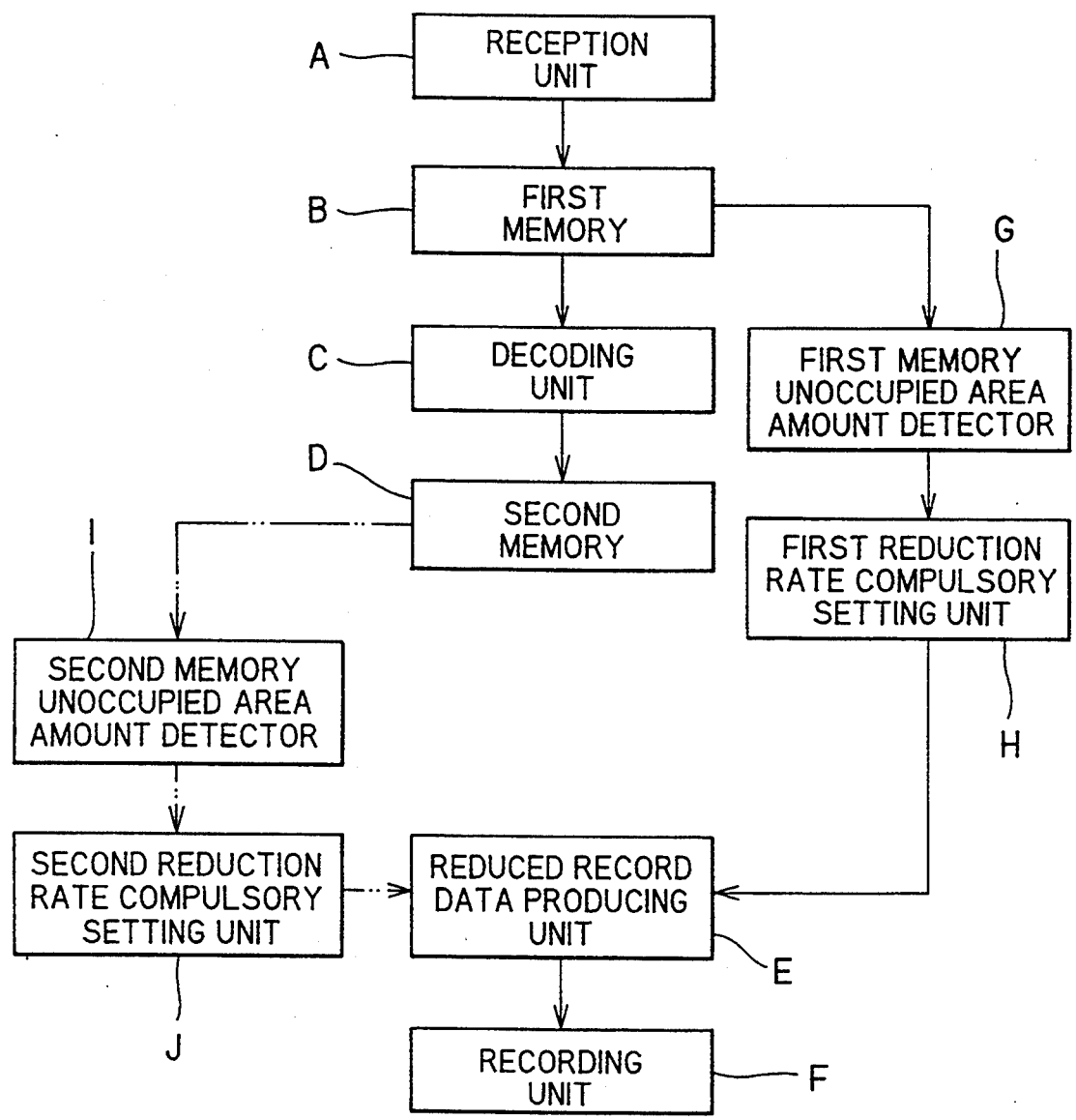
FIG. 1 is a block diagram schematically showing the structure of a facsimile machine of a first embodiment of the present invention.

A facsimile machine according to preferred embodiments of the present invention will be described while referring to the accompanying drawings wherein like parts and components are designated by the same reference numerals to avoid duplicating description.

First, a facsimile machine of a first embodiment of the present invention will be briefly described below with reference to FIG. 1.

The facsimile machine of the present invention mainly includes: a reception unit A, a first memory unit B, a decoding unit C, a second memory unit D, a reduced record data producing unit E, a recording unit F, a first memory unoccupied area amount detection unit G, and a first reduction rate compulsory setting unit H. The reception unit A receives coded image data representative of an image of each page of a document transmitted from a remote facsimile machine. The first memory unit B temporarily stores the image data supplied from the reception unit A. The decoding unit C decodes the image data retrieved from the first memory unit B into record data representative of a dot image corresponding to the image of the each page of the document. The second memory unit D temporarily stores the record data produced by the decoding unit C. The reduced record data producing unit E subjects the record data for each page of the document retrieved from the memory unit D to a thinning process where dots constituting the dot image represented by the record data are selectively omitted at a reduction rate. The unit E therefore produces reduced record data representative of a dot image reduced at the reduction rate from the dot image for the each page of the document. The recording unit F is provided for performing a recording operation for each cut sheet, with the reduced record data produced by the unit E for each page of the document.

According to the present invention, the first memory unoccupied area amount detection unit G detects the amount of the remaining memory area RM in the first memory unit B unoccupied by the image data. More specifically, the detection unit G calculates the amount of the remaining memory area RM, based on the data amount of the image data presently stored in the first memory unit B and the memory capacity of the first memory unit B. The first reduction rate compulsory setting unit H receives the information on the remaining memory area amount RM detected by the unit G. The unit H controls the reduced record data producing unit E to compulsorily set the reduction rate to a predetermined value when the remaining memory area amount RM is equal to or less than a first predetermined threshold value M.

The facsimile machine of the present embodiment may be further provided with a second memory unoccupied area amount detection unit I and a second reduction rate compulsory setting unit J. The second memory unoccupied area amount detection unit I detects the amount of the remaining memory area RN in the second memory unit D unoccupied by the record data. More specifically, the detection unit I calculates the amount of the remaining memory area RN, based on the data amount of the record data presently stored in the second memory unit D and the memory capacity of the second memory unit D. The second reduction rate setting unit J receives the information on the remaining memory area amount RN detected by the unit I. The unit J controls the reduced record data producing unit E to compulsorily set the reduction rate to the predetermined value when the remaining memory area amount RN is equal to or less than a second predetermined threshold value N.

Each of the units H and J performs its reduction rate compulsory setting operation for the record data for recording each cut sheet. For example, when the record data for each page of document are completely stored in the second memory unit D, the unit G or I may detect the amount RM or RN of the remaining memory area presently unoccupied by the image data or the record data in the memory unit B or D. In response to the result detected by the unit G or I, the unit H or J may selectively compulsorily set the reduction rate, at which the reducing unit E may subject the record data for the corresponding page of document to the thinning process to produce the reduced record data. Or otherwise, immediately before the recording unit F performs its recording operation for each cut sheet, the unit G or I may detect the amount RM or RN and the unit H or J may selectively compulsorily set the reduction rate.

A facsimile machine according to the first preferred embodiment of the present invention will be described in greater detail with reference to FIGS. 2 through 5.

The first preferred embodiment is directed to a facsimile machine of a type which can record, on cut sheets, images corresponding to image data transmitted from a remote facsimile machine in reception mode and corresponding to image data read out by the facsimile machine in copy mode. It is further noted that in the reception mode, the facsimile machine of this embodiment can record, on each cut sheet, an image that is reduced from an image of document transmitted from the remote facsimile at a desired reduction rate selected by an operator.

The structure of the facsimile machine 1 will be described below while referring to FIGS. 2 and 3.

An operation panel 3 is provided on the upper front portion of the main frame 2 of the facsimile machine 1. A plurality of function keys, such as a transmit key, a copy key, a recording speed key, a reduction rate setting key, and a number key pad, for executing processes such as transmission, reception, and copying of document data are provided to the operation panel 3. The reduction rate setting key is for setting a desired reduction rate, at which images of a plurality of pages of document transmitted from a remote facsimile machine may be reduced to be recorded onto a plurality of cut sheets. The reduction rate selectable by the manipulation of this key is in the range of 100% to 70%, for example.

A document tray 4 is provided directly behind the operation panel 3. The document tray 4 is provided for accepting single or stacked documents G to be transmitted or copied. The document tray 4 is adjustable to conform to a variety of different sized sheets, such as letter, legal or A4 size sheets.

Figure 3:
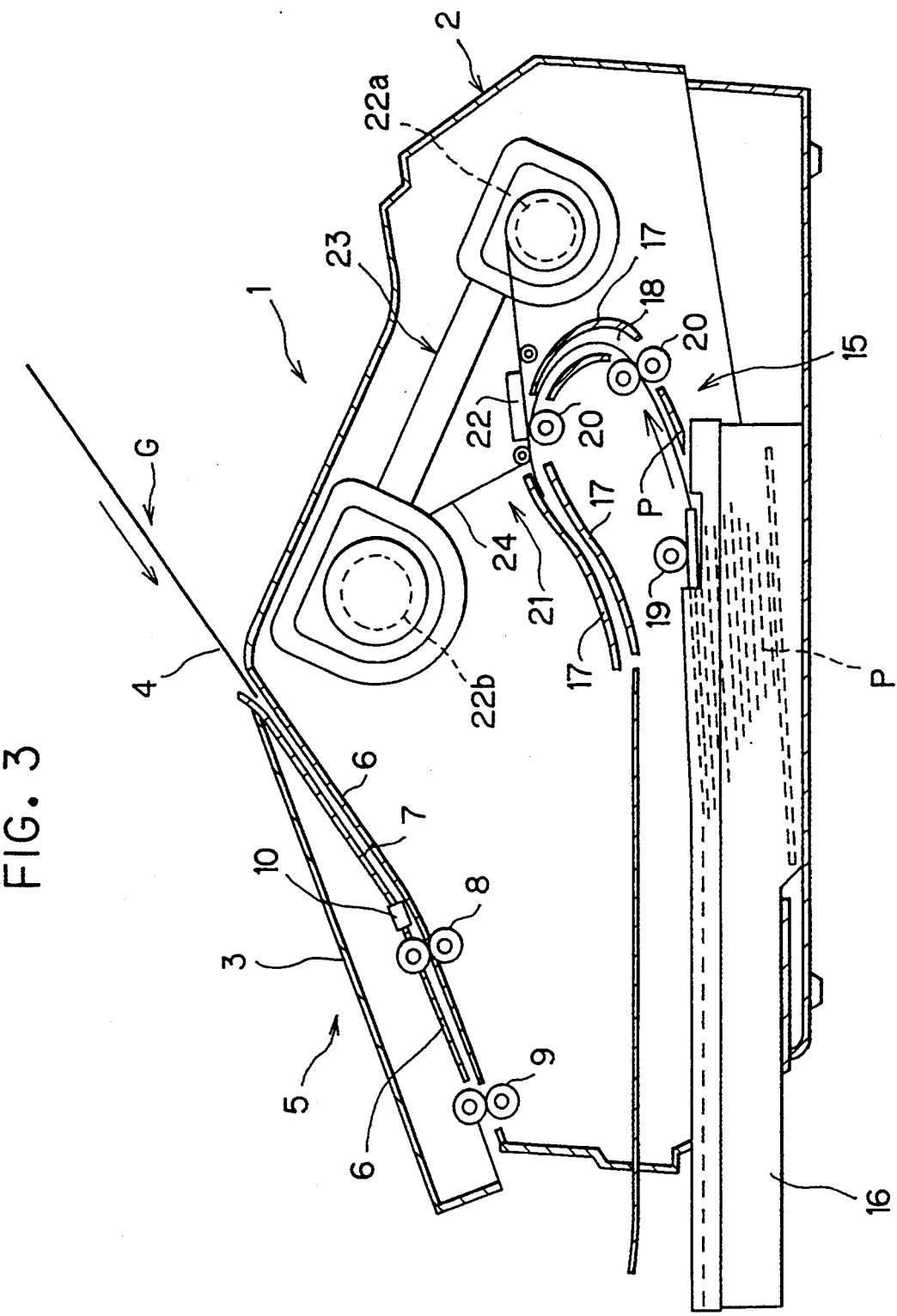
FIG. 3 is a sectional view taken along a line III—III of FIG. 2 showing an essential part of the facsimile machine of the embodiment.

Next, an explanation of a reading unit 5 for reading a document G set in the document tray 4 will be provided while referring to FIG. 3. The reading unit 5 is provided directly beneath the operation panel 3 in the interior of the frame 2. A plurality of guide walls 6 define a first sheet path 7 for guiding a document G set in the document tray 4 into and out of the facsimile machine 1. A pair of sheet supply rollers 8 for supplying a document G are provided essentially at a central portion of the first sheet path 7. A pair of discharge rollers 9 for discharging the document G are provided at a downstream portion (in regards to the flow of the document to be copied or transmitted) of the first sheet path 7. A document transport motor 35 shown in FIG. 4 is provided for rotating the sheet supply rollers 8 and the sheet discharge rollers 9 in synchronization.

Figure 4:
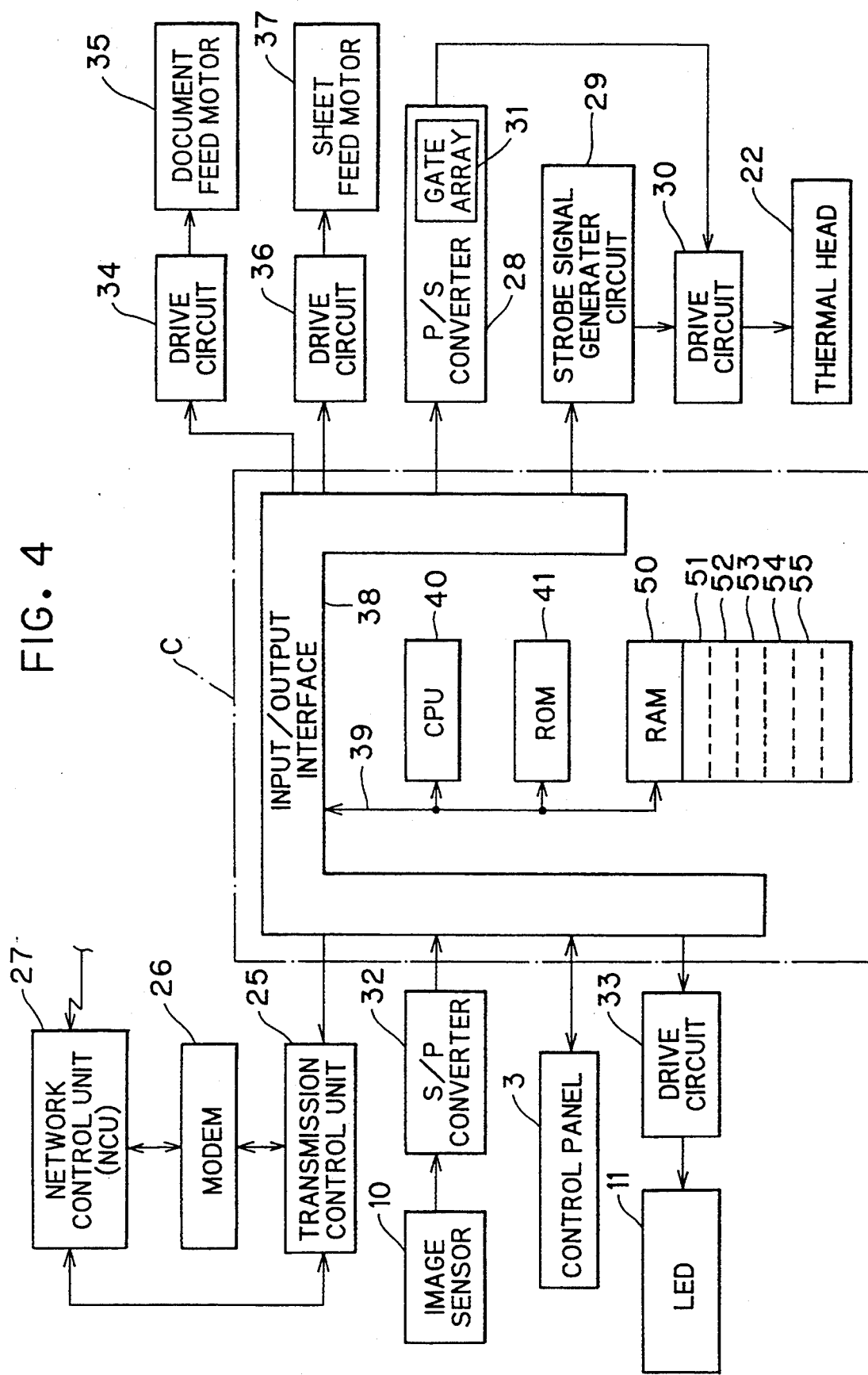
FIG. 4 is a block diagram showing a control system of the facsimile machine of the embodiment.

A light-emitting diode (LED) 11 shown in FIG. 4 as a read light source and an image sensor 10 are provided directly upstream from the sheet supply rollers 8 and positioned so as to face the first sheet path 7. The image sensor 10 is made from a charge coupled device (CCD) line image sensor, for example. The image sensor 10 accumulates electric charges via light emitted from the LED 11 and reflected from the document G so as to read each dot line of the document G. The image sensor then outputs line image data indicative of each dot line.

A transport unit 15 and a recording unit 21 are also provided to the interior of the frame 2. The transport unit 15 is for transporting, in an auxiliary scanning direction, a sheet P on which an image is to be recorded. The transport unit 15 includes a sheet cassette 16, a second guide path 18, a feed roller 19, a plurality of transport rollers 20 and a sheet feed motor 37. The sheet cassette 16 is detachably mounted to the lower interior portion of the frame 2. A stack of sheets P are stored in the sheet cassette 16. Various sizes of cassettes 16 can be mounted to the frame 2 for storing various sizes of cut sheets P, such as A4, B5, legal, or letter size cut sheets. The second guide path 18 is formed from a plurality of guide walls 17 so as to extend in a substantially U-shape from the rear of the sheet cassette 16. The feed roller 19 is positioned at the start end of the second guide path 18 near the sheet cassette 16. The plurality of transport rollers 20 are provided along the second guide path 18. The sheet feed motor 37 shown in FIG. 4 is provided for rotating the feed roller 19 and the transport rollers 20, in synchronization, at a rotational speed corresponding to a recording speed set through an operator's manipulation of the recording speed setting key.

The recording unit 21 is for recording, on the sheet P, an image corresponding to image data transmitted from a remote facsimile machine or the line image data obtained by the reading unit 5 to be copied from the document G. The recording unit 21 includes a thermal head 22 and a ribbon cassette 23. The thermal head 22 is positioned on the second guide path 18 in confrontation with one of the transport rollers 20. The thermal head 22 has a predetermined length in a main scanning direction, orthogonal to the auxiliary scanning direction, along which are aligned in a row a plurality (for example, 1,728) of thermal elements. The ribbon cassette 23 is provided to the upper side of the second guide path 18. A ribbon supply spool 22a is rotatably supported in the ribbon cassette 23. A ribbon take-up spool 22b is provided in the ribbon cassette 23 on the side of the thermal head 22 opposite from the ribbon supply spool 22a. An ink ribbon 24 with a width corresponding to the length of the thermal head 22 is stored wound on the ribbon supply spool in the ribbon cassette 23 and supported between the ribbon supply spool 22a and the ribbon take-up spool 22b so as to be in contact with the thermal head 22.

With the above-described structures, the transport unit 15 and the recording unit 21 cooperate to perform a recording operation both in a reception mode and in a copy mode, as described below. The sheet P at the top of the stack in the sheet cassette 16 is supplied to the second guide path 18 by the feed roller 19. Then, the sheet P is transported through the second guide path by the transport rollers 20 in the auxiliary scanning direction, at a transport speed corresponding to the recording speed set through the operator's manipulation of the recording speed setting key. The recording unit 21 performs the recording operation to record dot images in line increments on the sheet P. In other words, the sheet P is printed on using ink from the ink ribbon 24 and heat from the thermal head 22. The sheet P is then discharged out of the facsimile machine via the second guide path.

The control system of the facsimile machine 1 will be described below while referring to FIG. 4.

A transmission control unit 25 is individually connected to an input-output interface 38 of a control unit C, a transmission modem 26, and a network control unit (NCU) 27. The transmission control unit 25 is for controlling transmission operations when image data or a control signal received from the input-output interface 38 is transmitted to the modem 26, or when image data or a control signal received from the modem 26 is transmitted to the input-output interface 38. The modem 26 is for controlling modulation of transmission data of image data during transmission and demodulation of image data from a received transmission data during reception. The NCU 27 is for automatically controlling transmission of data to a remote facsimile machine and also reception of data from a remote facsimile machine.

A drive circuit 30 is provided for driving the thermal head 22. A strobe signal generator circuit 29 and a parallel/serial (P/S) converter 28 are individually connected to the drive circuit 30. The P/S converter 28 is for receiving reduced or non-reduced record data parallely outputted from the input-output interface 38 and for serially supplying the record data to the drive circuit 30. It is noted that a gate array 31 is provided to the P/S converter 28. The gate array 31 is for subjecting the reduced record data, representative of each dot line image, to a thinning process where dots constituting the corresponding dot line image are selectively omitted along the main scanning direction at the reduction rate, the reduction rate being set through the operator's manipulation of the reduction rate setting key or compulsorily set in the reduced or non-reduced record data producing operation of the present invention which will be described later.

The strobe signal generator circuit 29 is for supplying strobe signals to the drive circuit 30. Receiving the strobe signals, the drive circuit 30 drives the thermal head 22 in accordance with the record data supplied from the P/S converter 28.

Additionally, the transmission control unit 25, an S/P converter 32, the operation panel 3, drive circuits 33, 34 and 36, the P/S converter 28, and the strobe signal generator 29 are all individually connected to the input-output interface 38 of the control unit C. The S/P converter 32 is for converting serial image data outputted from the read sensor 10 into parallel image data. The drive circuit 33 is connected to the LED 11 for driving the LED 11. The drive circuit 34 is connected to the document feed motor 35 for driving the document feed motor 35. The drive circuit 36 is connected to the sheet feed motor 37 for driving the sheet feed motor 37.

The control unit C includes basically a central processing unit (CPU) 40, the input-output interface 38, a ROM 41, and a RAM 50. A bus 39 such as a data bus connects the input-output interface 38 to the CPU 40, the ROM 41, and the RAM 50. The ROM 41 stores various control programs for controlling entire facsimile machine 1 to perform the transmission, reception and copy modes of operations. More specifically, the ROM 41 stores therein an encoding control program, a decoding control program, a developing control program, a reduction control program, an image data memory unoccupied area amount detecting control program, a record data memory unoccupied area amount detecting control program, a reduced or non-reduced record data producing control program, a recording control program, etc.

The encoding control program is for producing a compressed (encoded) transmission signal from the line image data obtained by the reading unit 5 from the document G. The decoding control program is for expanding (decoding) each set of incoming coded image data representative of corresponding one of a plurality of line images of document transmitted from the remote facsimile machine. The developing control program is for developing each set of decoded image data representative of the corresponding line image into a set of record data. The each set of record data is in the form of dot data representing a dot line image of corresponding one of the plurality of line images.

The reduction control program is for subjecting the successive sets of record data to a thinning process where the successive dot line images represented by the successive sets of record data are selectively omitted in accordance with a reduction rate, the reduction rate being set through the operator's manipulation of the reduction rate setting key or compulsorily set in the reduced or non-reduced record data producing operation of the present invention. Accordingly, the reduction control program serves to selectively omit the successive dot line images in the auxiliary scanning direction. The reduction control program therefore serves to selectively omit the successive sets of record data and produce the reduced record data constructed by the thus selectively omitted successive sets of record data.

The image data memory unoccupied area amount detecting control program is for calculating an amount RM of an area unoccupied by the image data in an image data memory 51. More specifically, the image data memory unoccupied area amount detecting control program is for subtracting the amount of image data presently stored in the image data memory 51 from the maximum memory capacity of the image data memory 51. The record data memory unoccupied area amount detecting control program is for calculating an amount RN of an area unoccupied by the record data in a record data memory 53. More specifically, the record data memory unoccupied area amount detecting control program is for subtracting the amount of record data presently stored in the record data memory 53 from the maximum memory capacity of the record data memory 53.

The reduced or non-reduced record data producing control program is for executing the reduced or non-reduced record data producing operation of the present invention as will be described later. This control program is for selectively compulsorily setting the reduction rate, to be used in the reduction control program, to a predetermined value (for example, 70%), even when the operator manipulates the reduction rate setting key to select another value of reduction rate or the operator does not set any reduction rate, and for executing the reduction control program to produce the reduced record data.

The recording control program is for controlling the thermal head 22 and the rollers 19 and 20 to cooperate to perform the above-described recording operation at the recording speed selected through the operator's manipulation of the recording speed setting key.

Memory area in the RAM 50 is subdivided into the image data memory 51, a decoded data memory 52, a record data memory 53, a reduced or non-reduced record data memory 54, and an encoded data memory 55.

The image data memory 51 is for sequentially storing image data transmitted from the remote facsimile machine for several pages of document. For example, the image data memory 51 can store therein the image data of 256 kilobytes, at maximum. In other words, the capacity of the image data memory 51 is 256 kilobytes, for example. The decoded data memory 52 is for storing decoded image data which are obtained by sequentially retrieving the successive sets of image data representative of successive line images of the several pages of document from the image data memory 51 and by decoding the image data in accordance with the decoding control program. Each set of the decoded image data therefore represents a corresponding one of a plurality of line images constituting each one of the several pages of document. The decoded data memory 52 is also for storing the line image data obtained by the image sensor 10 during copy mode. The record data memory 53 is for storing record data which are obtained through retrieving the successive sets of decoded image data for respective line images from the decoded data memory 52 and developing the decoded image data in accordance with the developing control program. Each set of the record data is in the form of dot data and represents a high resolution dot line image of a corresponding one of a plurality of line images constituting each one of the several pages of document.

The reduced or non-reduced record data memory 54 is for storing the reduced or non-reduced record data which are obtained during the reduced or non-reduced record data producing operation of the present invention. The reduced record data are obtained through retrieving the successive sets of record data from the record data memory 53 and subjecting them to a thinning process where the successive dot line images represented by the successive sets of record data are selectively omitted in the auxiliary scanning direction at the reduction rate in accordance with the reduction control program. The non-reduced record data are obtained by retrieving the successive sets of record data from the record data memory 53 and inputting them to the memory 54 without subjecting them to any thinning processes.

The encoded data memory 55 is for storing encoded image data which are obtained by the reading unit 5 and are encoded in accordance with the encoding control program during transmission. Additionally, various memories are provided in the memory area of the RAM 50 for temporarily storing, for example, results of calculations performed in the CPU 40. A work area is also provided in the RAM 50 for storing data on the reduction rate to be used in the reduction control program. More specifically, the data on the reduction rate set through the operator's manipulation of the reduction rate setting key is stored in the work area. The data on the reduction rate compulsorily set in the reduced or non-reduced record data producing control program is also stored in the work area.

The facsimile machine 1 having the above-described structure operates, as will be described below.

In the transmission mode, the CPU 40 controls the driving circuits 33 and 34 to cause the reading unit 5 to read out the original document G. The image sensor 10 serially outputs a plurality of line image data indicative of the plurality of line images of the document G to the S/P converter 32. The S/P converter 32 parallely supplies the line image data to the interface 38 of the control unit C. The line image data are temporarily stored in the memory 52. The CPU 40 then encodes the line image data into encoded data according to the encoding control program stored in the ROM 41. The encoded data are temporarily stored in the encoded data memory 54. The control unit C then controls the transmission control unit 25 to transmit the encoded data to a remote facsimile machine, with the use of the modem 26 and the network control unit 27.

In the copy mode, similarly to the transmission mode, the line image data are obtained to be stored in the data memory 52. The control unit C parallely supplies the line image data into the P/S converter 28, which in turn serially outputs the line image data into the drive circuit 30. The control unit C controls the driving circuit 36 and the strobe signal generator circuit 29 to cooperate to perform the recording operation for recording an image with the line image data. As a result, an image the same as the image on the document G is recorded on the cut sheet P.

In the reception mode, an operator manipulates the recording speed selection key on the operation panel 3 to set a desired recording speed. The control unit C controls, via the transmission control unit 25, the network control unit 27 to cause coded image data to be transmitted from the remote facsimile machine to the facsimile machine 1 at a transmission speed corresponding to the selected recording speed. The operator can selectively manipulate the reduction rate setting key to select a desired reduction rate when the operator desires to cause the image transmitted from the remote facsimile to be reduced and recorded on the cut sheet. The information on the thus set reduction rate is stored in the work area of the RAM 50.

Now, assume that the remote facsimile machine transmits, to the facsimile machine 1, image data of a plurality of pages of document. The image data of the respective ones of the plurality of pages of document are consecutively received by the modem 26 and are transmitted through the transmission control unit 25 to the image data memory 51. Thus, the image data for the respective pages of document are consecutively inputted to the image data memory 51.

The CPU 40 then consecutively retrieves, from the image data memory 51, successive sets of image data, each set representing a corresponding one of a plurality of line images constituting each page of the document. The CPU then decodes the retrieved successive sets of image data into successive sets of decoded image data in accordance with the decoding control program stored in the ROM 41. The successive sets of decoded image data for the respective line images of each page are then sequentially stored in the decoded data memory 52.

The CPU 40 then consecutively retrieves, from the decoded data memory 52, the successive sets of decoded image data for the respective line images. The CPU then develops, in accordance with the developing control program, the successive sets of decoded image data into successive sets of record data, each set being in the form of dot data indicative of the corresponding line image of high dot density. The CPU then consecutively stores, into the record data memory 53, the successive sets of record data indicative of the respective line dot images.

When the first line image of the first page of the transmitted document is thus developed into one set of record data and stored in the memory 53, the CPU 40 starts performing the reduced or non-reduced record data producing operation for the first page, as described below.

Figure 5:
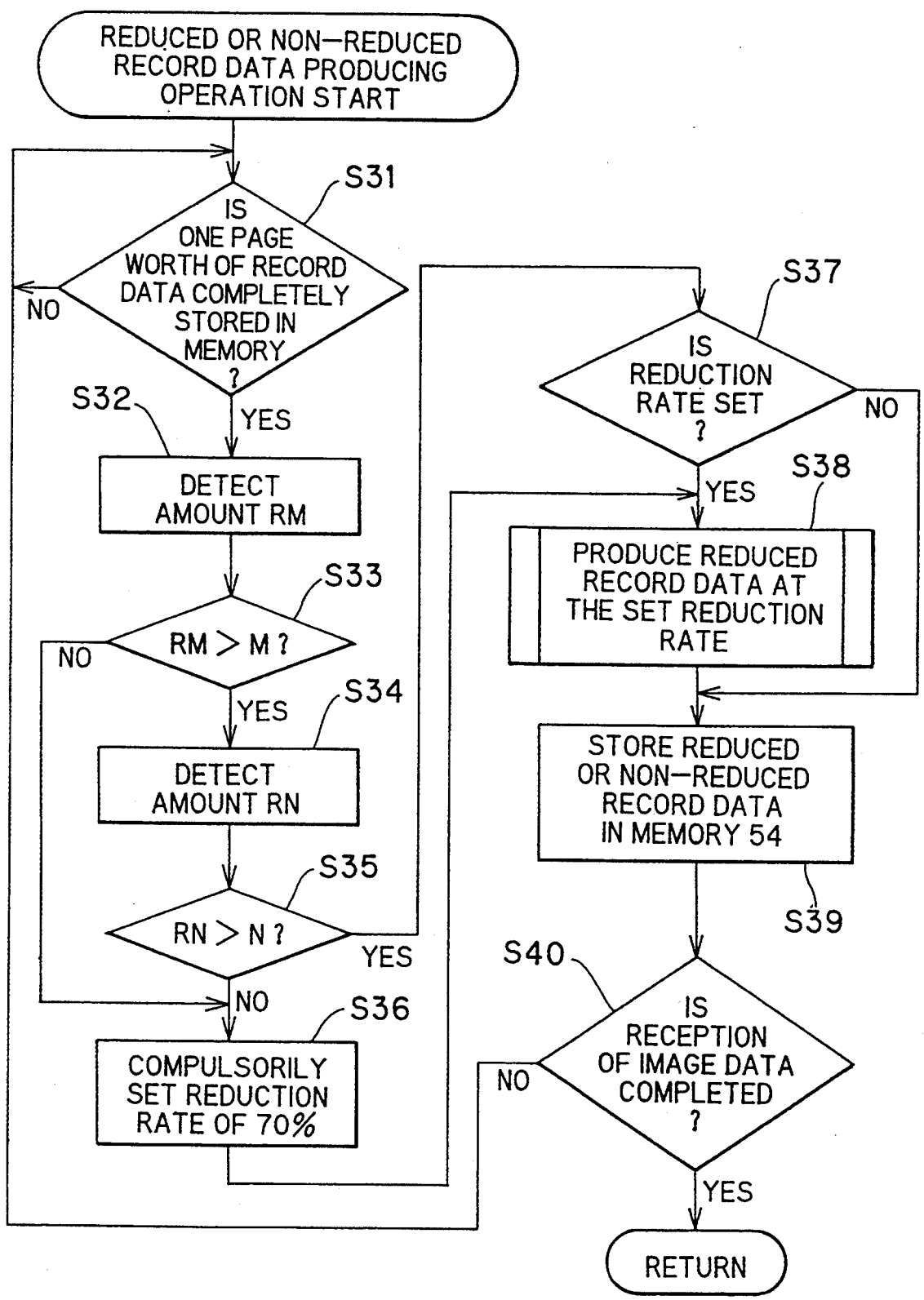
FIG. 5 is a flow chart of the reduced or non-reduced record data producing operation conducted in the facsimile machine of the embodiment.

As shown in FIG. 5, at the start of the reduced or non-reduced record data producing operation, whether all the successive sets of record data for the first page of document are completely stored in the record data memory 53 is determined in step S31. If so (i.e., step S31 is "YES"), the remaining memory area amount RM in the image data memory 51 unoccupied by the image data is detected by executing the image data memory unoccupied area amount detecting control program in step S32. Next, whether the remaining memory area amount RM is greater than a first predetermined value M (for example, 6 kilobytes) is determined in step S33. If so (i.e., step 33 is "YES"), the remaining memory area amount RN unoccupied by the record data in the record data memory 53 is detected by executing the record data memory unoccupied area amount detecting control program in step S34. Whether the remaining memory area RN is greater than a second predetermined value N (for example, 3 kilobytes) is then determined in step S35. If so (i.e., step S35 is "YES"), whether or not a reduction rate has been set by the operator's manipulation of the reduction rate setting key to be stored in the work area of the RAM 50 is determined in step S37. If not, (i.e., step S37 is "NO"), the successive sets of record data for the first page in the record data memory 53 are sequentially retrieved for the respective line images and stored in the reduced or non-reduced recording data memory 54 in step S39 without reduction processes being performed thereon. Thus, non-reduced record data for the first page of document are stored in the memory 54. Next, whether reception of image data is completed is determined in step S40. If not (i.e., step S40 is "NO"), the routine returns to step S31.

If in step S37 a reduction rate is determined as being set (i.e., step S37 is "YES"), in step S38 reduced record data are produced by subjecting the successive sets of record data for the first page stored in the record data memory 53 to a thinning process where the plurality of line images represented by the successive sets of record data are selectively omitted in the auxiliary scanning direction, by executing the reduction control program with the use of the reduction rate data stored in the work memory of the RAM 50. Thus obtained reduced record data for the first page are stored in the reduced or non-reduced record data memory 54. Then the program returns to step S31 if necessary as determined in step S40.

If in step S33 the remaining memory area amount RM in the image data memory 51 is determined to be equal to or less than the first predetermined value M (i.e., step S33 is "NO"), or if in step S35 the remaining memory area amount RM is greater than the predetermined value M, but the remaining memory area amount RN in the record data memory 53 is equal to or less than the second predetermined value N (i.e., step S33 is "YES" but step S35 is "NO"), a reduction rate of 70% is compulsorily and temporarily set and this data is stored in the work memory in step S36. Then, in step S38 reduced record data are produced by subjecting the successive sets of record data for the first page stored in the record data memory 53 to a thinning process where the successive sets of record data are selectively omitted in the auxiliary scanning direction through executing the reduction control program using the reduction rate data of 70% now stored in the work memory. The reduced record data thus obtained for the first page are then stored in the record data memory 54. Then the program returns to step S31 if necessary as determined in step S40.

It is noted that the reduction rate of 70% is proper for recording record data from a legal-size document (about 356 mm in length) on a letter-sized sheet (about 279 mm in length). In step S38 reduced record data are produced based on this 70% reduction rate by selectively omitting the successive sets of record data.

Thus, the above-described reduced or non-reduced record data producing operation selectively produces the reduced or non-reduced record data for the first page of document. The reduced or non-reduced record data producing operation is repeatedly conducted until when reception of image data is determined as completed in step S40. More specifically, when it is determined that the record data for the second page of document are completely stored in the memory 53 at step S31, the steps S32 through S39 are conducted to selectively produce the reduced or non-reduced record data for the second page of document. In other words, immediately after when all the record data for each page of document are completely stored in the memory 53, the steps S32 to S39 are conducted for selectively producing the reduced or non-reduced record data for the corresponding page of document.

When reception of image data is determined as completed in step S40 (i.e., step S40 is "YES"), control is finished and the program returns to the main routine.

Then, successive sets of the reduced or non-reduced record data representative of the successive line images of each page of document are consecutively retrieved from the memory 54 and fed to the P/S converter 28. When the P/S converter 28 receives the successive sets of non-reduced record data for one page of document, the converter 28 transmits them one after another to the drive circuit 30. Receiving drive signals from the strobe signal generator circuit 29, the drive circuit 30 consecutively drives the thermal elements of the thermal head 22 in accordance with the successive sets of non-reduced record data. A non-reduced image is therefore recorded on a record sheet P. On the other hand, when the P/S converter 28 receives the successive sets of reduced record data for one page of document, the gate array 31 in the converter 28 performs thinning process at the corresponding reduction rate where dots constituting each of the successive sets of record data are selectively omitted at the reduction rate. That is, the gate array 31 serves to reduce each dot line image in the main scanning direction. The resultant reduced record data are therefore reduced both in the auxiliary and the main scanning direction, before being supplied to the drive circuit 30. The drive circuit 30 receive the successive sets of reduced record data one after another. Receiving drive signals from the strobe signal generator circuit 29, the drive circuit 30 consecutively drives the thermal elements of the thermal head 22 in accordance with the successive sets of the reduced record data. An image reduced at the corresponding reduction rate is therefore recorded on a record sheet P.

Thus, each page of document is recorded on a cut sheet, in accordance with the reduced or non-reduced record data produced for the corresponding page of document.

As described above, when the remaining memory area amount RM in the image data memory 51 is equal to or less than the first predetermined value M, or when the remaining memory area amount RN in the record data memory 53 is equal to or less than the second predetermined value N, record data from the record data memory 53 is compulsorily thinned at the reduction rate of 70% to produce reduced record data for recording. Therefore, an image on a certain-sized document can be recorded on one sheet of a smaller-sized record sheet. For example, an image on a legal-sized document can be recorded on one letter-sized sheet. One page worth of image data from the document will not be divided and recording processes will not be interrupted. Therefore, the amount of data stored in the image data memory 51 and amount of data retrieved from the image data memory 51 for recording processes will remain in equilibrium. The image data memory 51 is prevented from becoming full so that reception of incoming image data will not be cut off because the image data memory is full.

In the above-described embodiment, the steps S32-S39 for producing the reduced or non-reduced record data for each cut sheet is achieved after when the record data for the corresponding page of document are completely stored in the record data memory 53 at step S31. However, the steps S32-39 for producing the reduced or non-reduced record data for each cut sheet may be achieved immediately before when the recording operation for the corresponding cut sheet is attained. In other words, after when the recording operation for each cut sheet is completed, the steps S32-S39 for producing the reduced or non-reduced record data for the next cut sheet may be achieved. More specifically, while each cut sheet completely recorded with the record data is being discharged out and the next cut sheet is being supplied to the recording unit 21, the reduced or non-reduced record data producing steps S32-39 may be achieved for this next cut sheet.

Figure 6:
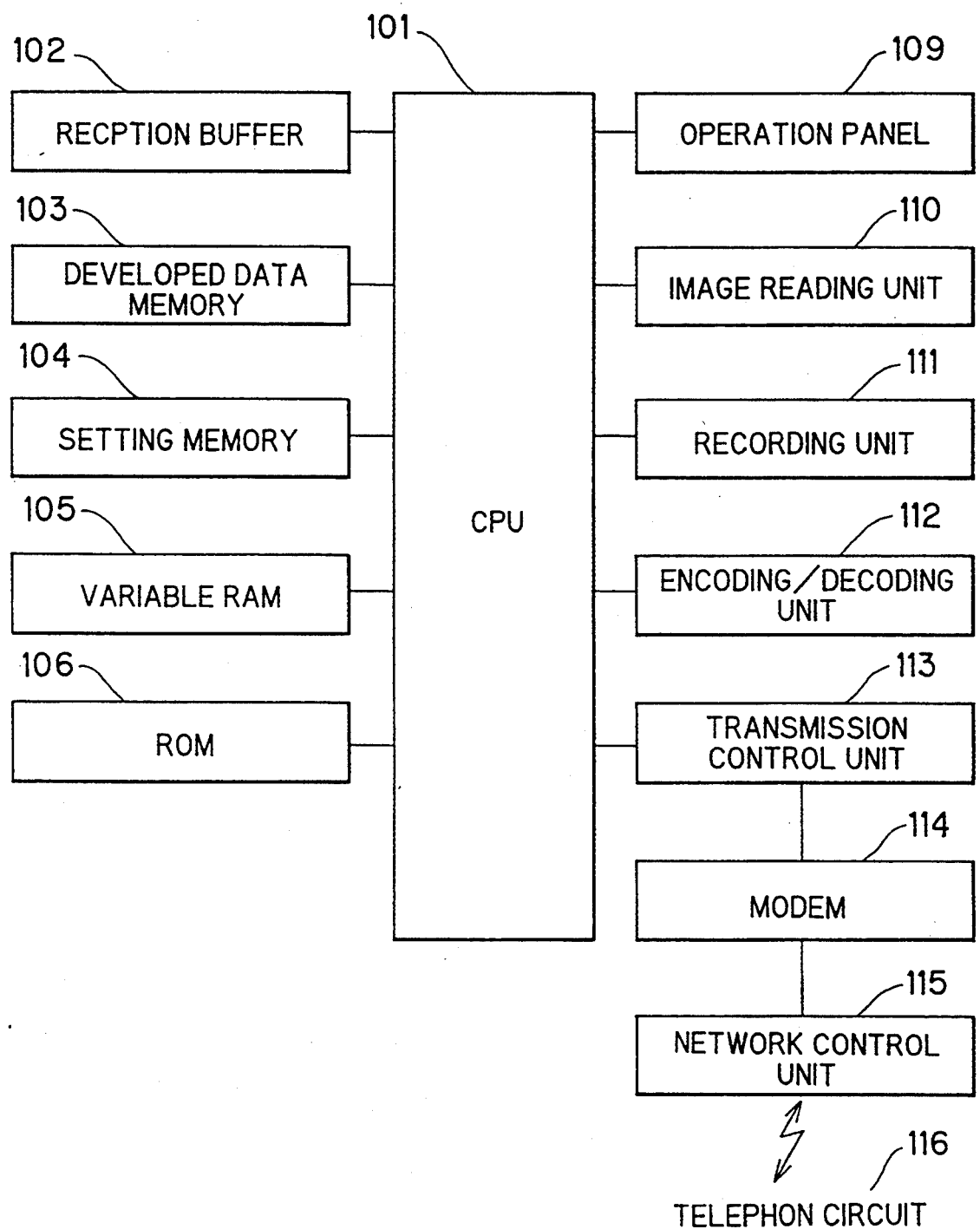
FIG. 6 is a block diagram showing a control system of a facsimile machine of a second embodiment.
Figure 7:
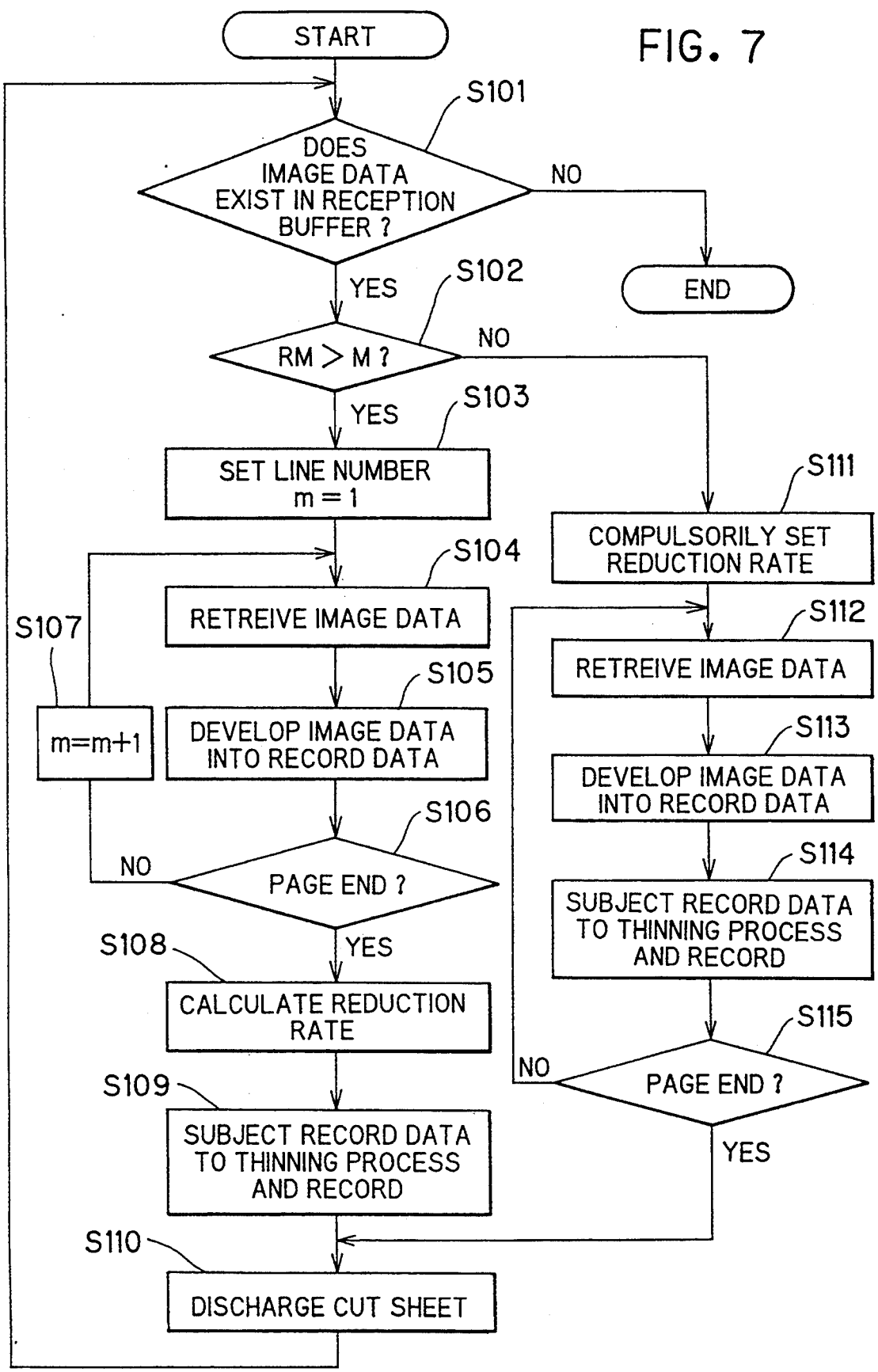
FIG. 7 is a flow chart of the reception mode operation conducted in the facsimile machine of the second embodiment.

Next, a facsimile machine according to a second preferred embodiment of the present invention will be described while referring to FIGS. 6 and 7. The second embodiment is directed to a facsimile machine of a type provided with an automatic reduction function.

To summarize, the facsimile machine of the present embodiment is provided with an automatic reduction function for calculating a reduction rate corresponding to the length of incoming image data and the length of a record cut sheet on which the incoming image data is to be recorded. According to the present invention, the facsimile machine includes: a memory for temporarily storing the image data before recording; a recording portion for recording, at the calculated reduction rate, the data stored in the memory; and a control portion for selectively stopping the automatic reduction function and causing recording of the data at another predetermined reduction rate.

Figure 2:
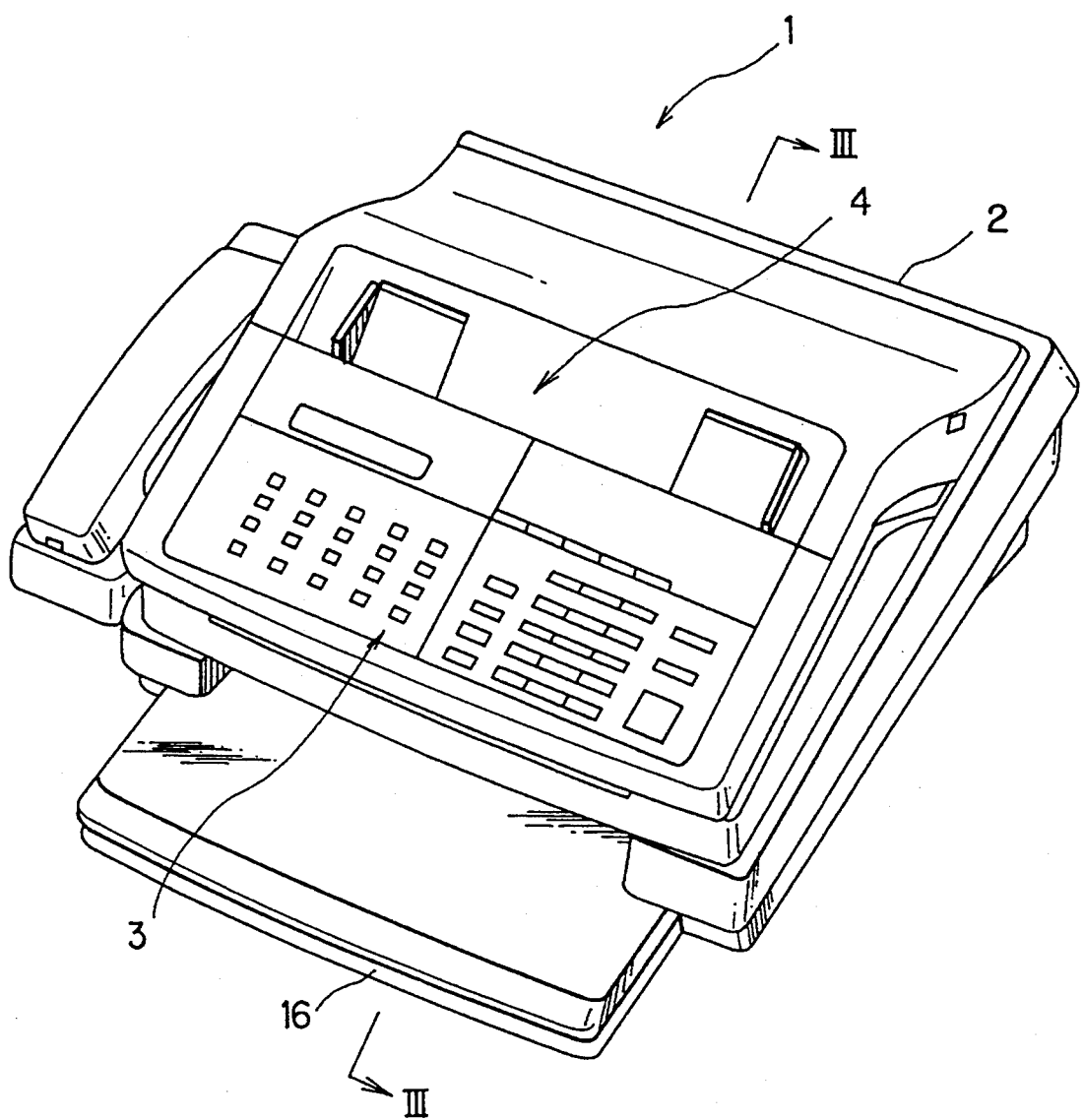
FIG. 2 is a perspective view showing overall structure of a facsimile machine according to the first embodiment.

The structure of the facsimile machine of the present embodiment is almost the same as that of the facsimile machine of the first embodiment shown in FIGS. 1, 2 and 3, except that the facsimile machine of this embodiment does not possess the unit I or J of FIG. 1.

First, the control system of the facsimile machine 100 of the present embodiment will be briefly described below with reference to FIG. 6.

A central control unit (CPU) 101 is provided for controlling each portion of the facsimile according to a control program. A reception buffer 102, a developed data memory 103, a setting memory 104, a variable RAM 105, and a ROM 106 are provided connected to the CPU 101. The reception buffer 102 is for temporarily storing received image data, and therefore corresponds to the image data memory 51 of the first embodiment. The developed data memory 103 is for storing one page worth of record data obtained through decoding and developing the image data retrieved from the reception buffer 102. The developed data memory 103 therefore corresponds to the record data memory 53 of the first embodiment. The setting memory 104 is for storing a reduction rate, a predetermined amount M to be compared with the amount of remaining memory area unoccupied by the image data in the reception buffer 102, etc. The setting memory 104 therefore corresponds to the RAM 50 of the first embodiment. The ROM 106 is for storing programs for controlling the overall operation of the facsimile machine, and therefore corresponds to the ROM 41 of the first embodiment.

An operation panel 109, an image reading unit 110, a recording unit 111, an encoding/decoding control portion 112, and a transmission control portion 114 are provided connected to the CPU 101. The operation panel 109 is provided as an input unit, and therefore corresponds to the operation panel 3 of the first embodiment. The image reading unit 110 is for reading the image data of a document to be transmitted or copied, and therefore corresponds to the image reading unit 5 of the first embodiment. The recording unit 111 is for recording received image data on a cut sheet, and therefore corresponds to the recording unit 21 of the first embodiment. The encoding/decoding control portion 112 is for compressing by encoding the image data during transmission, and for decoding compressed image data during reception. Therefore, the control portion 112 corresponds to the CPU 40 of the first embodiment. The transmission control portion 113 is for exchanging control signals with a remote facsimile machine and for implementing control procedures. The control portion 113 therefore corresponds to the transmission control unit 25 of the first embodiment. The transmission control portion 113 is connected to a telephone circuit 116 by a modem 114 and a network control portion 115. The modem 114 is for modulating the transmitted signal into a form appropriate for transmitting over the telephone circuit 116 during transmission and for demodulating a modulated signal sent over the telephone circuit 116 during reception. The modem corresponds to the modem 26 of the first embodiment. The network control portion 115 is for automatically calling a remote facsimile or detecting a call signal from a call terminal through the telephone circuit 116. The control portion 115 corresponds to the network control unit 27 of the first embodiment.

The facsimile machine 100 of this embodiment having the above structure operates in the same manner as the facsimile machine of the first embodiment, in the transmission mode and the copy mode. In the reception mode, the facsimile machine of this embodiment operates, as will be described below with reference to FIG. 7.

First, whether at least one set of image data representative of the first line of each page of document are stored in the reception buffer 102 is determined in step S101. If so (i.e., step S101 is "YES"), whether the remaining memory area amount RM unoccupied by the image data in the reception buffer 102 is greater than the predetermined amount M is determined in step S102. If so (i.e., step S102 is "YES"), then it is determined that sufficient memory can be secured in the reception buffer 102. Therefore, a variable m, which indicates the number of lines in one page worth of the received image data, is set to "1" in step S103. Next, one line worth of image data (one set of image data) is retrieved from the reception buffer 102 and decoded in step S104. Then the one set of decoded data is developed into one set of record data representative of a corresponding dot line image, and stored in the developed data memory 103 in step S105. When the one line worth of record data is thus completely stored in the memory 103, whether the page end is detected is determined in step S106. If not (i.e., step S106 is "NO"), "1" is added to the variable m in step S107 and , steps S104 through S107 are repeated until the page end is determined as detected in step S106.

When the page end is detected in step S107, that is, when one page worth of received image data are completely developed into the one page worth of record data, the number of lines that can be recorded on the cut sheet is divided by the total number m of the lines constituting the one page worth of the received data, to thereby calculate a reduction rate in step S108. Recording is then performed, while the record data stored in the developed data memory 103 is subjected to a thinning process at the calculated reduction rate, in step S109. When one page worth of data is completely recorded, the cut sheet is discharged in step S110. The program then returns to step S101 until no image data is left in the reception buffer 102, whereupon reception mode of operation is completed.

If the remaining memory area RM of the reception buffer 102 is determined as being equal to or lower than the predetermined amount M, that is, if it is determined that sufficient memory is not secured in the reception buffer 102, a predetermined reduction rate corresponding to the size of the cut sheet previously set in the facsimile machine is compulsorily and temporarily set to be used in step S111. Examples of the predetermined reduction rates would be 90% when a letter size cut sheet is set in the device, or 100% (the same size) when a legal size cut sheet is set in the device. It is noted that the size of the cut sheet is determined by the size of the cassette 16 storing the cut sheets and presently set in the facsimile machine 100.

Once a reduction rate is thus compulsorily and temporarily set, one line worth of image data is retrieved from the reception buffer 102 and decoded in step S112. The decoded data is developed into record data in the form of dot data, and the record data are stored in the developed data memory 103 in step S113. When one line worth of record data is stored in the developed data memory 103, recording is performed while the record data is thinned at the set reduction rate. After one line worth of recording has been completed, whether the page end has been detected is determined in step S115. If not (i.e., step S115 is "YES"), steps S112 through S115 are repeated until the page end is detected. When the page end is detected (i.e., step S115 is "YES"), the routine proceeds to step S110.

In this way, when the remaining memory area amount RM of the reception buffer 102 is equal to or less than the predetermined amount M, the reduction function is automatically stopped and received image data is recorded at a reduction rate set corresponding to the size of the cut sheet set in the facsimile machine 101. Therefore, when sufficient memory area is not secured in the reception buffer 102, recording can be started without confirming the number of lines in one page worth of data, that is, without waiting until reception of one page worth of data is completed. Accordingly the amount of data accumulated in the reception buffer 102 is reduced, and therefore reception of image data will not be stopped because of a full reception buffer 102. Therefore, efficiency of reception is increased.

While the present invention has been described with reference to specific embodiments thereof, it would be apparent to those skilled in the art that various changes and modifications may be made therein without departing from the spirit of the invention.

For example, in the first preferred embodiment, in regards to control of production of reduced image data, steps S34 and S35 can be omitted and reduction processes can be performed at 70% when the remaining memory area amount RM is equal to or less than the first predetermined value M. Alternatively, steps S32 and S33 can be omitted and reduction process can be performed at 70% when the remaining memory area amount RN is equal to or less than the second predetermined value N. The predetermined reduction rate is not limited to 70%, but may be selected to various values. The predetermined values M and N may be determined to have values corresponding to the memory capacities of the memories 51 and 53, respectively.

Also in the second preferred embodiment, a predetermined reduction rate to be used when sufficient memory is not secured in the reception buffer 102 is previously set in correspondence with the size of the cassette set in the facsimile machine. However, the reduction rate can be optionally set by an operator or can be automatically set to the previous reduction rate.

The present invention can be applied to facsimile machines provided with a variety of different recording units, such as thermal types or laser types.

The present invention can also be applied to recording apparatuses of a type which consecutively receives image data from an external input device such as a computer, temporarily stores the image data, processes the image data to obtain record data, and performs a recording operation with the record data.

What is claimed is:

1. A facsimile machine, capable of receiving image data from a remote facsimile machine representative of an image of at least one page of document and recording the image of the at least one page of document onto at least one cut sheet, respectively, comprising:
   reception means for receiving image data representative of an image of at least one page of document transmitted from a remote facsimile machine;
   first memory means for temporarily storing the image data supplied from the reception means;
   decoding means for retrieving the image data from the first memory means and for decoding the image data into record data representative of the image of the at least one page of document;
   second memory means for temporarily storing the record data produced by the decoding means;
   memory unoccupied area amount detection means for detecting at least one of the amount of a remaining memory area in the first memory means unoccupied by the image data and the amount of a remaining memory area in the second memory means unoccupied by the record data;
   compulsory reducing means for compulsorily converting the record data representative of the image of each of the at least one page of document into reduced record data representative of an image reduced from the image of the corresponding page at a predetermined reduction rate, when at least one of the first memory unoccupied area amount and the second memory unoccupied area amount detected by the memory unoccupied area amount detection means is equal to or less than corresponding one of first and second predetermined threshold values; and
   recording means for receiving one of the record data representative of the image of each page of document and the reduced record data representative of the reduced image of the corresponding page of document and for recording the corresponding image on one cut sheet.

2. A facsimile machine of claim 1, wherein the compulsory reducing means includes:
   judging means for judging whether or not at least one of the first memory unoccupied area amount and the second memory unoccupied area amount detected by the memory unoccupied area amount detection means becomes equal to or less than the corresponding one of the first and second predetermined threshold values; and
   compulsory reduction achieving means for compulsorily converting the record data representative of the image of a corresponding page of document into reduced record data representative of an image reduced from the image of the corresponding page at the predetermined reduction rate if it is judged that at least one of the first memory unoccupied area amount and the second memory unoccupied area amount detected by the memory unoccupied area amount detection means is equal to or less than the corresponding one of the first and second predetermined threshold values.

3. A facsimile machine of claim 2, wherein the memory unoccupied area amount detection means detects the at least one of the amount of the remaining memory area in the first memory means and the amount of the remaining memory area in the second memory means each time after when the record data representative of the image of each of the at least one page of document are completely stored in the second memory means, and
   wherein the judging means judges whether or not at least one of the first memory unoccupied area amount and the second memory unoccupied area amount detected by the memory unoccupied area amount detection means is equal to or less than the corresponding one of the first and second predetermined threshold values, the compulsory reduction achieving means compulsorily converting the record data representative of the image of a corresponding page of document into reduced record data representative of an image reduced from the image of the corresponding page at the predetermined reduction rate if it is judged that at least one of the first memory unoccupied area amount and the second memory unoccupied area amount detected by the memory unoccupied area amount detection means is equal to or less than the corresponding one of the first and second predetermined threshold values.

4. A facsimile machine of claim 2, wherein the memory unoccupied area amount detection means detects the at least one of the amount of the remaining memory area in the first memory means and the amount of the remaining memory area in the second memory means, at each time before when the recording means records the image of each of the at least one page of document on a cut sheet, and
   wherein the judging means judges whether or not at least one of the first memory unoccupied area amount and the second memory unoccupied area amount detected by the memory unoccupied area amount detection means is equal to or less than the corresponding one of the first and second predetermined threshold values, the compulsory reduction achieving means compulsorily converting the record data representative of the image of a corresponding page of document into reduced record data representative of an image reduced from the image of the corresponding page at the predetermined reduction rate if it is judged that at least one of the first memory unoccupied area amount and the second memory unoccupied area amount detected by the memory unoccupied area amount detection means is equal to or less than the corresponding one of the first and second predetermined threshold values.

5. A facsimile machine of claim 2, wherein the image data representative of the image of each of the at least one page of document includes a plurality sets of image data indicating a plurality of lines constituting the image of corresponding page of document, wherein the memory unoccupied area amount detection means detects the amount of the remaining memory area in the first memory means each time immediately after when at least one set of image data indicating at least one of the plurality of lines constituting the image of each of the at least one page of document is stored in the first memory means, and wherein the judging means judges whether or not the first memory unoccupied area amount detected by the memory unoccupied area amount detection means is equal to or less than the first threshold value, the compulsory reduction achieving means compulsorily converting the record data representative of the image of a corresponding page of document into reduced record data representative of an image reduced from the image of the corresponding page at the predetermined reduction rate if it is judged that the first memory unoccupied area amount detected by the memory unoccupied area amount detection means is equal to or less than the first threshold value.

6. A facsimile machine of claim 2, wherein the compulsory reduction achieving means includes:

compulsory reduction rate setting means for compulsorily setting the predetermined reduction rate at which the image of each of the at least one page of document is to be reduced to a reduced image if the judging means judges that at least one of the first memory unoccupied area amount and the second memory unoccupied area amount detected by the memory unoccupied area amount detection means is equal to or less than corresponding one of first and second predetermined threshold values; and reducing means for converting the record data representative of the image of the corresponding page of document into reduced record data representative of the image reduced from the image of the corresponding page at the set reduction rate.

7. A facsimile machine of claim 6, further comprising a reduction rate setting means for setting a desired reduction rate, the reducing means converting the record data representative of the image of each page of document into reduced record data representative of an image reduced from the image of the corresponding page at the reduction rate set by the reduction rate setting means, wherein the compulsory reduction rate setting means sets the predetermined reduction rate, regardless of the reduction rate set by the reduction rate setting means, if the judging means judges that at least one of the first memory unoccupied area amount and the second memory unoccupied area amount detected by the memory unoccupied area amount detection means is equal to or less than corresponding one of first and second predetermined threshold values, to thereby compulsorily cause the reducing means to convert the record data representative of the image of each page of document into reduced record data representative of an image reduced from the image of the corresponding page at the predetermined reduction rate.

8. A facsimile machine of claim 7, wherein the reduction rate setting means includes reduction rate calculation means for calculating the desired reduction rate, based on the amount of the image data representative of the image of each page of document and a size of the cut sheet on which the image of each page of document is to be recorded, the reducing means converting the record data representative of the image of each page of document into reduced record data representative of an image reduced from the image of the corresponding page at the desired reduction rate calculated by the reduction rate calculating means, wherein the compulsory reduction rate setting means sets the predetermined reduction rate, regardless of the reduction rate calculated by the reduction rate calculating means, if the judging means judges that the first memory unoccupied area amount detected by the memory unoccupied area amount detection means is equal to or less than the first predetermined threshold value, to thereby compulsorily cause the reducing means to convert the record data representative of the image of each page of document into reduced record data representative of an image reduced from the image of the corresponding page at the predetermined reduction rate.

9. A facsimile machine of claim 8, wherein the predetermined reduction rate is determined dependently on the size of the cut sheet on which the image of each page of document is to be recorded.

10. A facsimile machine of claim 6, wherein the decoding means includes:

decoded image data producing means for decoding the image data into decoded image data; and developing means for developing the decoded image data into record data in the form of dot data which represent a dot image formed from a plurality of dots and corresponding the image of the at least one page of document.

11. A facsimile machine of claim 10, wherein the reducing means subjects the record data to a thinning process in which the plurality of dots constituting the dot image representing the image of each of the at least one page of document are selectively omitted at the set reduction rate.

12. A facsimile machine of claim 11, wherein the record data representative of the image of each of the at least one page of document includes a plurality sets of record data indicating a plurality of lines arranged in an auxiliary scanning direction to constitute the image of the corresponding page of document, each set of the plurality sets of record data representing a dot line image formed from a plurality of dots arranged in a main scanning direction orthogonal to the auxiliary scanning direction, and wherein the reducing means includes:

auxiliary scanning direction reducing means for selectively omitting the plurality of sets of record data at the set reduction rate; and main scanning direction reducing means for selectively omitting the plurality of dots represented by each set of the sets of record data selectively remained by the auxiliary scanning direction reducing means, at the set reduction rate.

13. An image recording apparatus, capable of receiving image data from an external input device representative of an image of at least one page of document and recording the image of the at least one page of document onto at least one cut sheet, respectively, comprising:

reception means for receiving image data representative of an image of at least one page of document transmitted from an external input device;

first memory means for temporarily storing the image data supplied from the reception means;

processing means for retrieving the image data from the first memory means and for processing the image data into record data representative of the image of the at least one page of document;

memory unoccupied area amount detection means for detecting the amount of a remaining memory area in the first memory means unoccupied by the image data;

compulsory reducing means for compulsorily converting the record data representative of the image of each of the at least one page of document into reduced record data representative of an image reduced from the image of the corresponding page at a predetermined reduction rate, when the first memory unoccupied area amount detected by the memory unoccupied area amount detection means is equal to or less than a first predetermined threshold value; and recording means for receiving one of the record data representative of the image of each page of document and the reduced record data representative of the reduced image of the corresponding page of document and for recording the corresponding image on one cut sheet.

14. An image recording apparatus of claim 1, wherein the compulsory reducing means includes:

judging means for judging whether or not the first memory unoccupied area amount detected by the memory unoccupied area amount detection means becomes equal to or less than the first predetermined threshold value; and compulsory reduction achieving means for compulsorily converting the record data representative of the image of a corresponding page of document into reduced record data representative of an image reduced from the image of the corresponding page at the predetermined reduction rate if it is judged that the first memory unoccupied area amount detected by the memory unoccupied area amount detection means is equal to or less than the first predetermined threshold value.

15. An image recording apparatus of claim 14, wherein the image data representative of the image of each of the at least one page of document includes a plurality sets of image data indicating a plurality of lines constituting the image of corresponding page of document, wherein the memory unoccupied area amount detection means detects the amount of the remaining memory area in the first memory means each time immediately after when at least one set of image data indicating at least one of the plurality of lines constituting the image of each of the at least one page of document is stored in the first memory means, and wherein the judging means judges whether or not the first memory unoccupied area amount detected by the memory unoccupied area amount detection means is equal to or less than the first threshold value, the compulsory reduction achieving means compulsorily converting the record data representative of the image of a corresponding page of document into reduced record data representative of an image reduced from the image of the corresponding page at the predetermined reduction rate if it is judged that the first memory unoccupied area amount detected by the memory unoccupied area amount detection means is equal to or less than the first threshold value.

16. An image recording apparatus of claim 14, wherein the compulsory reduction achieving means includes:

compulsory reduction rate setting means for compulsorily setting the predetermined reduction rate at which the image of each of the at least one page of document is to be reduced to a reduced image if the judging means judges that the first memory unoccupied area amount detected by the memory unoccupied area amount detection means is equal to or less than the first predetermined threshold value; and reducing means for converting the record data representative of the image of the corresponding page of document into reduced record data representative of the image reduced from the image of the corresponding page at the set reduction rate.

17. An image recording apparatus of claim 16, further comprising a reduction rate setting means for setting a desired reduction rate, the reducing means converting the record data representative of the image of each page of document into reduced record data representative of an image reduced from the image of the corresponding page at the reduction rate set by the reduction rate setting means, wherein the compulsory reduction rate setting means sets the predetermined reduction rate, regardless of the reduction rate set by the reduction rate setting means, if the judging means judges that the first memory unoccupied area amount detected by the memory unoccupied area amount detection means is equal to or less than the first predetermined threshold value, to thereby compulsorily cause the reducing means to convert the record data representative of the image of each page of document into reduced record data representative of an image reduced from the image of the corresponding page at the predetermined reduction rate.

18. An image recording apparatus of claim 16, wherein the reduction rate setting means includes reduction rate calculation means for calculating the desired reduction rate, based on the amount of the image data representative of the image of each page of document and a size of the cut sheet on which the image of each page of document is to be recorded, the reducing means converting the record data representative of the image of each page of document into reduced record data representative of an image reduced from the image of the corresponding page at the desired reduction rate calculated by the reduction rate calculating means, wherein the compulsory reduction rate setting means sets the predetermined reduction rate, regardless of the reduction rate calculated by the reduction rate calculating means, if the judging means judges that the first memory unoccupied area amount detected by the memory unoccupied area amount detection means is equal to or less than the first predetermined threshold value, to thereby compulsorily cause the reducing means to convert the record data representative of the image of each page of document into reduced record data representative of an image reduced from the image of the corresponding page at the predetermined reduction rate.

19. An image recording apparatus of claim 18, wherein the predetermined reduction rate is determined dependently on the size of the cut sheet on which the image of each page of document is to be recorded.

* * * * *